Jan. 12, 1954   C. W. VOGT   2,665,648
PRODUCTION OF PLASTIC MASSES
Filed May 16, 1949   2 Sheets-Sheet 1

INVENTOR.
CLARENCE W. VOGT
BY Hubert E. Evans
ATTORNEY.

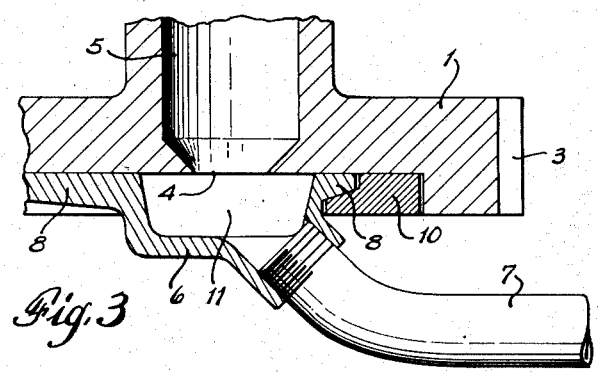
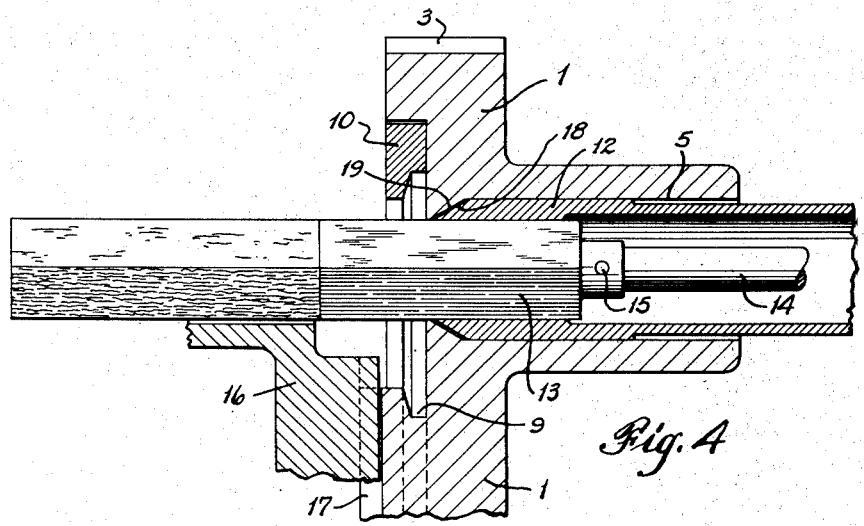
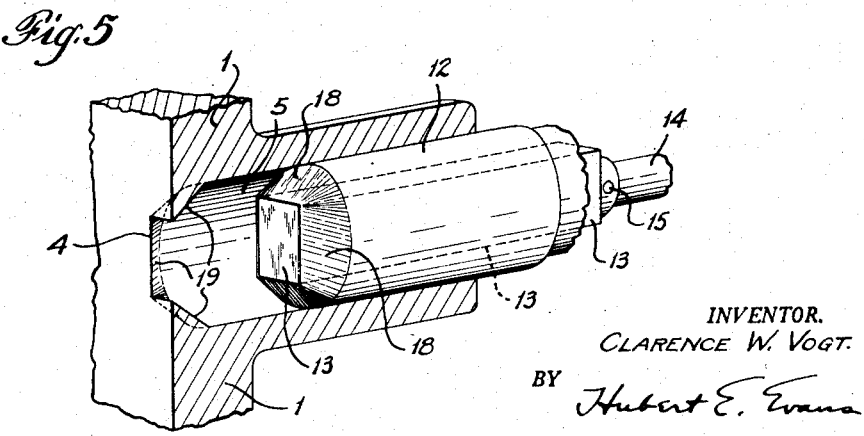

Patented Jan. 12, 1954

2,665,648

UNITED STATES PATENT OFFICE 2,665,648

PRODUCTION OF PLASTIC MASSES

Clarence W. Vogt, Norwalk, Conn.

Application May 16, 1949, Serial No. 93,599

6 Claims. (Cl. 107—15)

This invention relates to production of unit masses of plastic material and in particular to apparatus for producing units of plastic material which are measured and formed or molded to a given size, shape, and amount.

This application is a continuation-in-part of my copending application Serial No. 90,852, filed May 2, 1949 and entitled Production and Packaging of Plastic Materials.

It is an object of the present invention to provide apparatus for forming units of plastic material by the use of a molding cavity having an expanded cross sectional area and less depth as compared to the unit or mass of plastic material produced.

In the production of units of plastic material it is a problem to obtain uniformly accurate masses of a predetermined size and shape, each of which contains a desired accurate amount of the plastic material. It is believed that this is due to the resistance of the plastic material to flowing and completely filling the molding cavity. The problem is accentuated where the molding cavity is relatively deep. Further, it is obvious that the shape or configuration of the molding cavity may render it more difficult to fill. The present invention has for its object the reduction in depth of the molding cavity by the use of an enlarged bore and the use of a novel piston member construction to expel the plastic material from the molding cavity. In this way there is less depth to the molding cavity and accordingly it may be filled with a reduced pressure applied to the plastic material.

To provide a more accurate adjustment of the size of the molding cavity which controls the size and amount of each plastic mass, it is considered desirable to expel the plastic material from the molding cavity in a direction perpendicular to a plane passing through the smallest cross sectional area of the resultant mass. This means that the adjustment to the size of the mass is accomplished on the smallest cross sectional area thereof permitting more accurate and minute adjustment. It is therefore another object to provide apparatus for producing masses of plastic material which facilitate the formation of the mass in a direction perpendicular to the smallest cross sectional area thereof.

A further object is to provide apparatus for producing masses of plastic material involving the use of a molding cavity and a dual piston member to permit filling and expelling a mass without requiring a piston stroke as long as the mass produced. It is desirable to fill the molding cavity by placing pressure on the plastic and simultaneously retracting the piston to obviate the problems (found in present commercial plastic molding practices) of displacing the air in the molding cavity. Removal of the air displacement problem assists in obtaining greater accuracy in the masses produced since each of the molding cavities is completely filled.

Other objects and advantages will become apparent from the following detailed description accompanied by the drawings in which:

Fig. 3 is another enlarged sectional view taken substantially on line 3—3 of Figure 1 with parts and material not shown, to illustrate further details of the mechanism;

Fig. 4 is another enlarged fragmentary sectional view taken substantially on line 4—4 of Figure 1 and showing principles of operation of the device; and Fig. 5 is an enlarged fragmentary perspective view of a single station of the mechanism to more clearly show certain details of the construction.

The present invention deals with the production of units or masses of a plastic substance or materials. For the purposes of this description the term "plastic substance" or "plastic material" means a semi-plastic or plastic or partially set or solidified substance which under the conditions at the time it is being acted on may be formed or molded or extruded by the use of relatively low pressures. Such materials may be flowed or forced through relatively small conduits or passages by the application of pressure. However, such materials will generally not flow under the influence of gravity to an appreciable extent. Examples of plastic materials to which the present invention may be applied are butter, margarine, lard, partially or frozen confections such as ice cream, etc., and many other materials whether edible or not having the capacity of being flowable or moldable.

A primary feature of the present invention is the design and arrangement of a mechanism and a sequence of operations to facilitate the production of molded masses each of which is uniform and accurate in its size, shape, and amount. In essence, unit masses of plastic material are produced in accordance with the present invention by forcing plastic material from a suitable source of supply into one or more molding cavities having a controlled size and shape, and forming individual masses by expelling or expressing the plastic material from the molding cavity utilizing a piston member having a plurality of movable parts. During portions of the operation these movable parts may move together as a unit and at other times they may move with respect to each other. Preferably the molding cavity is formed in an end face of a rotary member having an opening from such end face and an enlarged cavity interiorly of the opening. In this way the length of the formed mass may be greater than the depth of the molding cavity.

Figure 1:
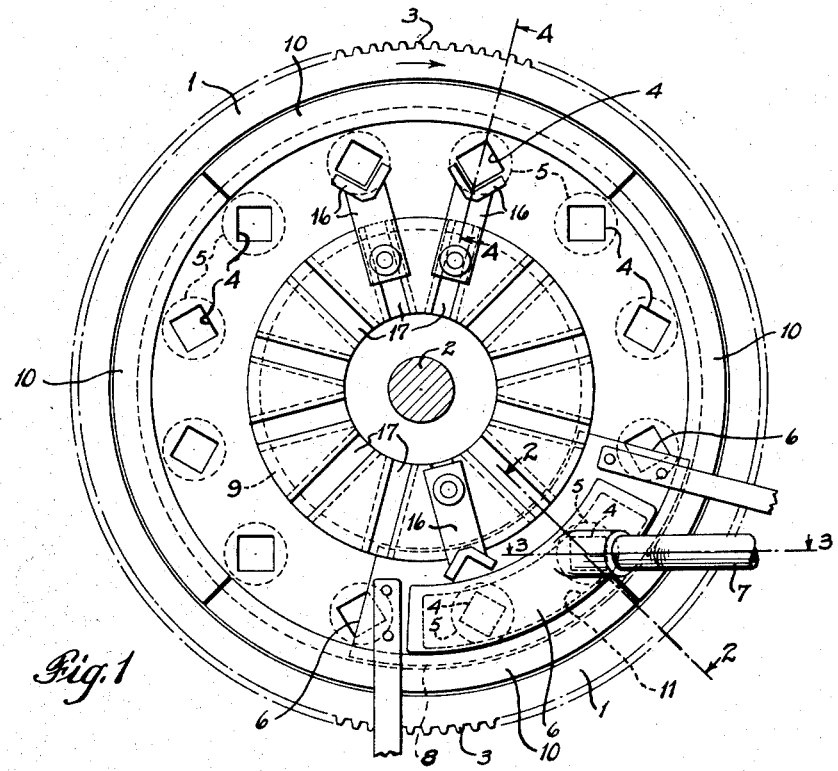
Figure 1 is an elevational view of a diagrammatic showing of a portion of an apparatus embodying the present invention.

Figure 1 shows an end face of a rotary member 1 mounted for rotation on a shaft 2. The shaft 2 may be suitably supported in a frame (not shown). The outer periphery of the rotary member may be provided with gear teeth 3 adapted to mesh with a driving pinion (not shown) which may be powered from any suitable source. Opening from the end face of the rotary member 1 may be one or more forming apertures 4 each of which leads to a molding cavity 5. To fill the molding cavities 5 with plastic material a manifold or filling shoe 6 may be carried from a suitable support (not shown) so that it is disposed in fixed position in abutment with the end face of the rotary member 1. Connected to the manifold is a supply conduit or pipe 7 leading from any suitable source of supply of plastic material (not shown). The plastic material may be forced or flowed under pressure through the conduit 7 by any suitable mechanism such as a gear pump, a helical screw, a piston pump, etc., which will supply the plastic to the manifold and to the molding cavity.

Alternatively the conduit 7 might be supplied with material directly from a continuous process apparatus capable of producing plastic material. This is believed to be especially advantageous since the apparatus shown in the drawings may be designed to accommodate the full production of the material and in effect supplements the continuous processing from manufacture of the material until it is formed into measured units. With a number of materials, the consistency of which may vary, it is believed desirable to maintain the material in motion to avoid affecting the consistency. According to the present invention the mechanism may be designed and constructed so that material is continuously moving through the conduit and the manifold and into the molding units or cavities in the rotary member 1.

To adjustably hold the face of the manifold 6 to the face of the rotary member 1 with the desired pressure to prevent undue leakage during the movement of these parts with respect to each other, the manifold may be provided with tapered flange portions 8 along its marginal edges. Radially inwardly of each of the molding cavities 5 the rotary member 1 may be provided with a groove or track 9 to receive and retain one of the tapered flange portions 8 of the manifold. Radially outwardly of the molding cavities the tapered flange portion 8 of the manifold 6 may be held in place by a removable ring member 10 which is preferably split into appropriate segments to facilitate removal of the manifold 6 when desired for cleaning or other purposes. These removable segments of the ring member 10 may be held to the rotary member 1 in any suitable manner such as by bolts (not shown). It is also desirable to design and construct the removable ring 10 so that it may be adjusted in a generally radial direction with respect to the shaft 2 and as may be seen in the drawings this will vary the degree of tightness with which the manifold 6 is held against the face of the rotary member 1. This adjustment is important to provide a variation in the pressure with which the manifold is held to the rotary member to take up looseness which might occur due to wear of the manifold and to facilitate the handling of different types of material on the apparatus.

Plastic material forced through the conduit 7 may be flowed through an aperture 11 in the manifold 6 and when a molding cavity 5 moves into registry with the aperture 11 of the manifold the plastic material may be forced through the forming aperture 4 and into the enlarged portion of the molding cavity 5. As shown in the drawings the forming aperture 4 has a square configuration but it will be understood that the forming aperture may be round, rectangular, triangular, hexagonal, or any other desired shape.

For ease of manufacture the molding cavity 5 may preferably be cylindrical. Mounted within the cylindrical section of the molding cavity for sliding movement therealong is a first piston member 12. The piston member 12 has an outer periphery which may be closely fitted to the cylindrical bore of the molding cavity. Where the nature of the plastic material makes it desirable that the piston 12 fit closely adjacent the wall of the molding cavity 5, it is believed preferable that these two complementary surfaces be cylindrical as production machine tools can readily provide closely fitting surfaces of this character.

Figure 2:
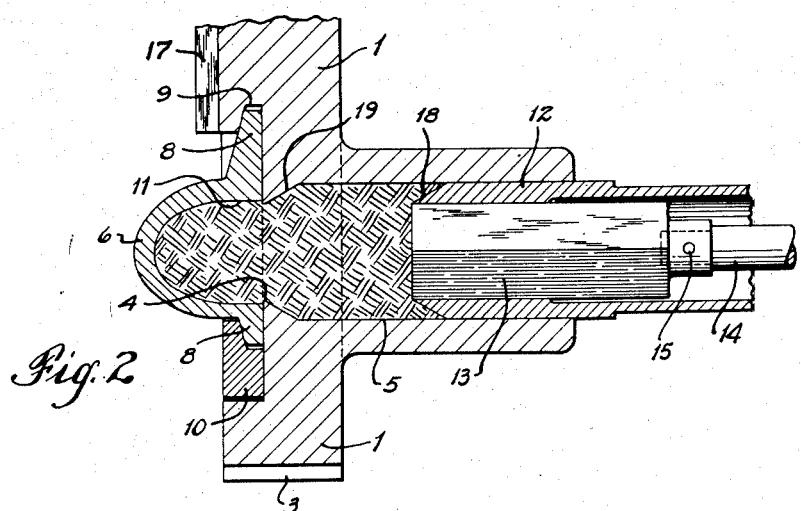
Fig. 2 is an enlarged fragmentary sectional view taken substantially on line 2—2 of Figure 1 to illustrate details of a portion of the apparatus shown in Figure 1.

The piston 12 may be actuated in any suitable manner (not shown). For example, it may be connected with a sleeve which extends inwardly from the end face of the rotary member 1 with the sleeve carrying a follower controlled by a stationary cylindrical cam mounted on the shaft 2. Then as the rotary member 1 is moved the cam may closely control and actuate the piston 12 in the desired manner. The piston 12 is hollow to accommodate for sliding movement a second piston member 13. The piston member 13 has a cross sectional configuration corresponding to the forming aperture 4 which in the form of the invention shown is square. Preferably the square portion of the piston 13 is of a relatively short extent to minimize the problem of closely fitting the piston within the hollow portion of the piston 12 where the nature of the plastic material makes a close fit between these parts desirable or essential. The piston 13 may as shown in Figs. 2 and 4 be secured to a piston rod 14 of any desired cross sectional configuration being held to the piston rod by a pin 15.

At a suitable point spaced inwardly from the face of the rotary member 1 the piston rod 14 may carry a roller follower (not shown) which engages the track of a second stationary cylindrical cam (not shown) which may be mounted on the shaft 2 to actuate and control the piston 13. It is believed desirable that the actuating means for the pistons 12 and 13 be designed so that during filling of the molding cavity, that is while the molding cavity is in registry with the manifold aperture 11, there will be little if any relative movement between the piston members.

This will reduce the tendency for leakage of the plastic material between the moving surfaces of these parts. As the molding cavity comes into registry with the manifold 6 the pistons 12 and 13 should be flush or substantially flush with the face of the rotary member 1 so that there can be no air pockets in the molding cavity. Then as the molding cavity becomes aligned with the aperture 11 through the manifold and the pressure of the plastic material from the source of supply is applied to the molding cavity, the piston members 12 and 13 should be simultaneously retracted at a rate approximately equal to or slightly less than the rate of movement of the plastic material under pressure. As the piston members are retracted the plastic material is forced into the molding cavity and the cavity is filled. When the piston members reach the inner limit of their movement the molding cavity is filled with a predetermined volume of the plastic material and preferably the point of inward movement of the piston members is adjustable to vary the volume of the molding cavity and make allowances for changes in the characteristics of the plastic material. For example, where each mass of plastic material must be of a given weight, it will be necessary to adjust the volume of the molding cavity to obtain the desired weight due to changes in the physical properties such as density of the plastic material. At approximately the point of inward movement of the piston members 12 and 13 the molding cavity should pass under the sealing land of the manifold so that it is no longer in registry with the aperture 11 through the manifold.

Further movement of the rotary member will advance the molding cavity from beneath the manifold and at the desired point in the rotary cycle of the rotary member the pistons 12 and 13 may commence movement toward the aperture 4 to expel or express plastic material from the molding cavity. It is considered desirable to move the piston members 12 and 13 simultaneously to expel a preponderance of the plastic material from the molding cavity. At this point the piston member 12 may be disposed adjacent the aperture 4 of the molding cavity 5 as indicated in Fig. 4. The piston member 13 may then continue in motion and expel or express additional plastic material from the molding cavity. The continued movement of the piston member 13 also serves to advance the formed mass outwardly from the face of the rotary member from which the molding cavity opens. This position is indicated in Fig. 4. The formed mass may be deposited onto a suitable support member indicated by the number 16 in Figure 1. If desired the receiving surface of the support member may have been previously provided with a suitable enwrapment to permit packaging of the formed mass. A more complete description of the packaging of formed masses of plastic material may be found in my copending application Serial No. 90,852, filed May 2, 1949, and entitled Production and Packaging of Plastic Materials.

Preferably the support member 16 is mounted for radial movement along the face of the rotary member 1 so that it may move radially outwardly into receiving position as the formed mass is expelled from the molding cavity. The support member may also move radially inwardly as the molding cavity moves under the manifold 6. To provide for accurate sliding movement of the support member the face of the rotary member may be provided with a dovetailed track or slideway 17.

Movement of the support member is also very desirable when the plastic material has a tendency to adhere to surfaces which it contacts. After the plastic mass has been expelled and an enwrapment disposed therearound, the support member 16 may be moved with respect to the piston member to cleanly remove or separate the plastic mass from the piston and wipe the piston face of plastic tending to adhere thereto. This may be extremely important where each mass of plastic is to be accurately and uniformly measured, as described in my previously identified copending application Serial No. 90,852.

Since the bore of the molding cavity is greater than the forming aperture 4, it is desirable that the end face of the piston member 12 at the outer portion of its periphery be relieved or chamfered to provide a tapered end surface indicated by the numeral 18 and shown best in Fig. 5. Correspondingly, it is believed desirable that the wall of the molding cavity be provided with a generally complementary tapering surface indicated by the numeral 19 at the junction of the molding cavity 5 and the forming aperture 4. Thus, when the piston 12 approaches the opening of the molding cavity the generally complementary tapered surfaces 18 and 19 may force plastic material therebetween in the direction of the forming aperture to completely empty the molding cavity. However, it is not considered necessary to completely empty the molding cavity on each stroke of the piston members and it is felt that a clearance may be maintained between the surfaces 18 and 19 as indicated in Fig. 4.

It is considered an advantage of the present invention that in addition to the benefits derived from decreasing the depth of the molding cavity, an additional benefit is obtained from the use of a molding cavity of increased diameter together with a dual piston construction. The plastic material after being forced into the molding cavity under pressure as the piston is retracted, is then forced in the opposite direction by the piston members. This means that during the cycle of filling and expelling from the molding cavity the plastic mass is subjected to pressures from both ends, and if the piston members are permitted to retract beyond their desired inner limit of movement and then be moved to their proper position prior to the passage of the molding cavity under the sealing land of the manifold at which time no additional material may be placed in the molding cavity, plastic masses which have been subjected to pressure at both ends are provided. Masses of plastic material produced in this fashion tend to be more free from voids or other defects which would tend to prevent the complete filling of the molding cavity.

An especially valuable feature of the present invention arises out of the fact that the mechanism disclosed in the drawings is particularly adapted for operation in a continuous cycle. With a suitable number of stations or molding cavities spaced around the end face of the rotary member, one of the molding cavities is moving into alignment with the manifold and being filled at all times. Such arrangement permits connecting the mechanism to a source of supply which will continuously produce a proper amount of plastic material and the plastic material may be kept moving through the molding and packaging operations. It will be obvious that if the plastic material is maintained in continuous motion there will be less opportunity for it to vary than if it were subjected to the intermittent pressure occasioned by a succession of starts and stops.

It is also contemplated that in the production of some types of plastic masses it may be advantageous to position molding cavity so that its axis is disposed at an angle differing from the horizontal shown in the drawings. For example, the shaft 2 may be disposed in a vertical position or at some suitable angle between vertical and horizontal, and with the axes of the molding cavity parallel to the shaft 2, the plastic material may be formed in either an upward or downward direction. When the molding cavities are tilted it will be noted that the filling of the cavities will be accomplished in an opposite direction from the expelling, that is, if the cavity is filled in a downward direction the expelling will be accomplished in an upward direction.

It is also believed that it may be of assistance in obtaining complete filling of the molding cavity to direct the conduit leading from the source of supply of the plastic material and the aperture through the manifold so that the plastic material is flowed toward the molding cavity in the direction of movement of the molding cavity. This principle is particularly illustrated in Fig. 3 of the drawings. However, the direction of the supply line carrying the plastic material may be varied to provide the best filling characteristics. The location of the supply line as shown in Fig. 3 may be desirable in that it may tend to clean or scour the face of the piston and remove any film or layer of plastic material which may be directed thereupon as the molding cavity passes into the manifold. It is felt that in the case of plastic materials such as margarine or the like, containing fatty substances which tend to break down and become more liquid due to having been worked, the removal of such a film or layer from the piston face may facilitate the production of formed plastic masses.

As previously stated the packaging of the plastic masses may be accomplished on the same apparatus after they have been completely formed. To accomplish this result it is merely necessary to properly position a suitable enwrapment on the support member 16 so that it may be disposed around the plastic mass and folded to completely enclose the same. Enwrapments suitable for accomplishing this packaging are more fully disclosed in my co-pending applications Serial No. 56,942, filed October 28, 1948, and entitled Wrappers; Serial No. 73,295, filed January 28, 1949, and entitled Chained Enwrapments; and, Serial No. 83,044, filed March 23, 1949, and entitled Articles for Use in Packaging, although obviously other forms of enwrapments may be utilized.

In the form of the invention shown in the drawings, the second piston member 13 has a square cross sectional configuration corresponding to and aligned with the forming aperture 4. This permits completing the expulsion of plastic material from the molding cavity by movement of the piston member 13 as well as the conveying of the formed plastic mass to a desired position outwardly from the molding cavity. The amount of clearance between the piston member 13 and the forming aperture 4 may be determined in accordance with the characteristics of the particular plastic material being acted upon. This clearance may also vary according to the cross sectional configuration of the piston member 13 which as stated may be rectangular, round, triangular, hexagonal, or other desired shape. In fact the cross sectional configuration of the piston member and the forming aperture may vary from that of the packaged plastic mass. By way of illustration a cylindrical plastic mass may be formed and disposed within a tubular enwrapment and the mass may subsequently be reshaped to a square or rectangular or other desired configuration. In such a case the enwrapment may be disposed loosely around the mass and the reshaping operation will act to tighten the enwrapment with respect to the mass. This is for the reason that a circular configuration has less perimeter for a given cross sectional area than any other configuration.

Thus it may be seen that the present invention permits the production of formed plastic masses utilizing molding cavities of less depth and increased cross section than the resultant plastic mass, which decreases the depth of the molding cavity and permits the use of lower filling pressures. At the same time this arrangement improves the complete filling which contributes to the production of accurate, uniform masses of a given size, shape, and amount of plastic.

It will be understood that the foregoing description of preferred embodiments of the invention is for the purpose of explanation and illustration and numerous variations and modifications other than those which have been described may be made without departing from the spirit of the invention.

What I claim is:

1. In apparatus for forming masses of plastic material, a molding cavity, a member defining a forming aperture at the opening to said molding cavity, said forming aperture having a smaller cross sectional area than the cross sectional area of said cavity, a first piston member in said molding cavity and mounted for sliding movement therein, said first piston member being formed with a bore having a shape and area equal to that of the forming aperture, a second piston member mounted for sliding movement within the bore of said first piston member and extensible through said forming aperture, and means for actuating said piston members simultaneously and independently.

2. In apparatus for producing a unit mass of plastic material, a movable member, a cylindrical molding cavity defined by said member, portions of said member defining a rectangular forming aperture leading to said molding cavity, said forming aperture having a reduced cross sectional area as compared with said molding cavity, a cylindrical piston mounted for sliding movement in said molding cavity, and a rectangular piston mounted for sliding movement in said cylindrical piston and having a cross sectional configuration complementary with that of said forming aperture, said rectangular piston being movable through said forming aperture to evacuate plastic from said molding cavity.

3. Apparatus for producing formed units of plastic material which comprises a movable member having portions defining a forming aperture and a molding cavity, said molding cavity having a greater cross-sectional area than said forming aperture, a first piston mounted for sliding movement in said molding cavity, a second piston mounted for sliding movement in said first piston and extensible through said forming aperture, means for actuating said pistons to fill and expel plastic material from said molding cavity, a stationary hollow member disposed adjacent the path of said movable member, means for forcing plastic material through said hollow member to fill said molding cavity, said means for actuating said pistons causing simultaneous movement of said first and second pistons when said molding cavity is in communication with said stationary hollow member.

4. Apparatus for producing formed masses of plastic material which comprises a plurality of molding units mounted for movement in an endless path, a stationary hollow manifold member disposed adjacent the path of said molding units, means for forcing plastic material through said manifold member to fill said molding units, each of said molding units including a first piston member mounted for sliding movement in said molding unit and a second piston member mounted for sliding movement in said first piston member, and means for actuating said piston members during movement of said molding units according to a predetermined cycle of simultaneous and independent movements.

5. An apparatus for forming a mass of plastic material, a measuring cavity of circular configuration, portions defining a forming opening from said measuring cavity having a non-circular configuration, a cylindrical piston member mounted for sliding movement in said cavity, and a second piston member mounted for sliding movement in said first piston member, said second piston member having a configuration complementary with that of said forming opening and being extensible therethrough.

6. In apparatus for forming plastic masses, a molding cavity, portions defining an opening to said molding cavity of smaller cross-sectional area than said cavity, a first piston member shaped to conform to the cross-sectional shape of the cavity mounted for sliding movement in said molding cavity, said first piston member having an axial bore of a cross-sectional shape corresponding to that of the opening of the molding cavity, and a second piston member mounted for sliding movement in the bore of said first piston member, and corresponding in shape to said bore, whereby said first and second piston members may extrude plastic material from the molding cavity by simultaneous movement and subsequently the second piston member may pass through said opening.

CLARENCE W. VOGT.

References Cited in the file of this patent

UNITED STATES PATENTS

| Number | Name | Date |
|---|---|---|
| 444,379 | Fowler et al. | Jan. 6, 1891 |
| 692,903 | Rainbow | Feb. 11, 1902 |
| 693,631 | Tilden et al. | Feb. 18, 1902 |
| 1,447,166 | Alumbaugh | Mar. 6, 1923 |
| 1,463,851 | Smith | Aug. 7, 1923 |
| 1,649,307 | Hunter | Nov. 15, 1927 |
| 1,685,460 | Myers et al. | Sept. 25, 1928 |
| 1,719,931 | Hall | July 9, 1929 |
| 1,967,933 | Hall | July 24, 1934 |
| 1,968,808 | Carpenter | Aug. 7, 1934 |
| 1,984,027 | Lyons | Dec. 11, 1934 |
| 2,004,161 | Fausel | June 11, 1935 |
| 2,068,619 | Bailey | Jan. 19, 1937 |
| 2,126,416 | Schlichter | Aug. 9, 1938 |
| 2,494,212 | Spriggs et al. | Jan. 10, 1950 |

FOREIGN PATENTS

| Number | Country | Date |
|---|---|---|
| 25,298 | Great Britain | Nov. 9, 1906 |